(12) United States Patent
Wei et al.

(10) Patent No.: US 11,424,942 B2
(45) Date of Patent: Aug. 23, 2022

(54) BLOCKCHAIN INTEGRATED STATIONS AND AUTOMATIC NODE ADDING METHODS AND APPARATUSES

(71) Applicant: ALIPAY (HANGZHOU) INFORMATION TECHNOLOGY CO., LTD., Zhejiang (CN)

(72) Inventors: Changzheng Wei, Hangzhou (CN); Ying Yan, Hangzhou (CN); Hui Zhang, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/361,236

(22) Filed: Jun. 28, 2021

(65) Prior Publication Data

US 2021/0328816 A1   Oct. 21, 2021

(30) Foreign Application Priority Data

Jul. 8, 2020   (CN) .......................... 202010652949.5

(51) Int. Cl.
*H04L 29/06* (2006.01)
*H04L 9/32* (2006.01)
(Continued)

(52) U.S. Cl.
CPC .......... *H04L 9/3268* (2013.01); *H04L 63/123* (2013.01); *H04L 67/10* (2013.01); *H04L 2209/38* (2013.01)

(58) Field of Classification Search
CPC ..... H04L 9/3268; H04L 63/123; H04L 67/10; H04L 2209/38
See application file for complete search history.

(56) References Cited

U.S. PATENT DOCUMENTS 10,123,202 B1 * 11/2018 Polehn ................. H04W 12/42
10,824,684 B2    11/2020 Pennell et al.
(Continued)

FOREIGN PATENT DOCUMENTS

CN   106301792   1/2017
CN   107171829   9/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Ghodrat Jamshidi
(74) *Attorney, Agent, or Firm* — Fish & Richardson P.C.

(57) ABSTRACT

A blockchain integrated station receives a first configuration instruction after accessing a certificate authority network. The blockchain integrated station initiates an authentication application to a certificate authority center of the certificate authority network based on a first network address indicated in the first configuration instruction. The blockchain integrated station receives a digital certificate from the certificate authority center after the certificate authority center determines that the authentication application passes verification. The blockchain integrated station receives a second configuration instruction after accessing a blockchain network. The blockchain integrated station sends the digital certificate to a first blockchain node in the blockchain network based on a second network address indicated in the second configuration instruction, where the digital certificate is used to trigger the first blockchain node to add the blockchain integrated station as a new blockchain node in the blockchain network.

17 Claims, 5 Drawing Sheets

(51) Int. Cl.
*H04L 9/40* (2022.01)
*H04L 67/10* (2022.01)

(56) References Cited

U.S. PATENT DOCUMENTS

| | | | |
|---|---|---|---|
| 10,958,450 B1* | 3/2021 | Yamada | H04L 9/3247 |
| 11,050,763 B1* | 6/2021 | Lyle | H04L 63/0823 |
| 11,159,609 B2 | 10/2021 | McGrath et al. | |
| 2008/0274716 A1 | 11/2008 | Fok et al. | |
| 2010/0230489 A1* | 9/2010 | Sugiyama | H04L 12/283 |
| | | | 235/382 |
| 2015/0006689 A1* | 1/2015 | Szilagyi | H04L 41/0806 |
| | | | 709/222 |
| 2017/0180134 A1 | 6/2017 | King | |
| 2017/0346639 A1 | 11/2017 | Muftic | |
| 2018/0183587 A1 | 6/2018 | Won et al. | |
| 2018/0267539 A1 | 9/2018 | Shih | |
| 2019/0034459 A1* | 1/2019 | Qiu | H04L 9/3239 |
| 2019/0036711 A1* | 1/2019 | Qiu | H04L 9/3268 |
| 2019/0036712 A1 | 1/2019 | Qiu | |
| 2019/0104196 A1 | 4/2019 | Li et al. | |
| 2019/0205773 A1 | 7/2019 | Ackerman et al. | |
| 2019/0251555 A1 | 8/2019 | McCormick et al. | |
| 2019/0317924 A1 | 10/2019 | Alimi et al. | |
| 2019/0347656 A1 | 11/2019 | Lu et al. | |
| 2019/0363896 A1 | 11/2019 | Finlow-Bates | |
| 2019/0373137 A1* | 12/2019 | Krukar | G06F 3/1222 |
| 2019/0386969 A1* | 12/2019 | Verzun | H04L 63/102 |
| 2019/0392164 A1* | 12/2019 | Dutta | G06F 21/602 |
| 2020/0004846 A1 | 1/2020 | Camenisch et al. | |
| 2020/0034353 A1 | 1/2020 | Innocenti | |
| 2020/0145234 A1 | 5/2020 | Nishijima | |
| 2020/0250177 A1* | 8/2020 | Padmanabhan | G06F 16/214 |
| 2020/0259646 A1* | 8/2020 | Kwak | H04L 9/3239 |
| 2020/0312005 A1* | 10/2020 | Desai | H04L 67/2861 |
| 2020/0320417 A1 | 10/2020 | Corning | |
| 2020/0372594 A1 | 11/2020 | Li | |
| 2020/0387533 A1 | 12/2020 | Nolte et al. | |
| 2020/0387893 A1* | 12/2020 | Maim | H04L 9/3234 |
| 2021/0012278 A1 | 1/2021 | Alon et al. | |
| 2021/0119768 A1 | 4/2021 | Han et al. | |
| 2021/0135867 A1* | 5/2021 | Zeng | H04L 63/12 |
| 2021/0160314 A1 | 5/2021 | Parvataneni et al. | |
| 2021/0271681 A1 | 9/2021 | Jayaram et al. | |
| 2021/0280306 A1 | 9/2021 | Fairless et al. | |
| 2021/0328813 A1 | 10/2021 | Wei et al. | |
| 2021/0328814 A1 | 10/2021 | Wei et al. | |
| 2021/0337023 A1 | 10/2021 | Yang | |
| 2022/0045868 A1 | 2/2022 | Falk et al. | |

FOREIGN PATENT DOCUMENTS

| | | |
|---|---|---|
| CN | 107360001 | 11/2017 |
| CN | 107426157 | 12/2017 |
| CN | 108667618 | 10/2018 |
| CN | 108737106 | 11/2018 |
| CN | 108765058 | 11/2018 |
| CN | 109067543 | 12/2018 |
| CN | 109242467 | 1/2019 |
| CN | 109299333 | 2/2019 |
| CN | 109327528 | 2/2019 |
| CN | 109743328 | 5/2019 |
| CN | 110035059 | 7/2019 |
| CN | 110213058 | 9/2019 |
| CN | 110535628 | 12/2019 |
| CN | 110611647 | 12/2019 |
| CN | 110874747 | 3/2020 |
| CN | 110958118 | 4/2020 |
| CN | 111092724 | 5/2020 |
| CN | 111383021 | 7/2020 |
| EP | 3813321 A1 | 4/2021 |
| JP | 2018173692 | 11/2018 |
| KR | 102002509 | 7/2019 |
| WO | 2020088110 A1 | 5/2020 |

OTHER PUBLICATIONS

Nakamoto, "Bitcoin: A Peer-to-Peer Electronic Cash System," www.bitcoin.org, 2005, 9 pages.

Extended European Search Report in European Appln. No. 21178838.5, dated Dec. 3, 2021, 8 pages.

Extended European Search Report in European Appln. No. 21179784.0, dated Dec. 2, 2021, 8 pages.

Extended European Search Report in European Appln. No. 21179811.1, dated Dec. 2, 2021, 8 pages.

* cited by examiner

BLOCKCHAIN INTEGRATED STATIONS AND AUTOMATIC NODE ADDING METHODS AND APPARATUSES

CROSS-REFERENCE TO RELATED APPLICATIONS

This application claims priority to Chinese Patent Application No. 202010652949.5, filed on Jul. 8, 2020, which is hereby incorporated by reference in its entirety.

TECHNICAL FIELD

The present disclosure relates to the field of terminal technologies, and in particular to blockchain integrated stations and automatic node adding methods and apparatuses thereof.

BACKGROUND

Blockchain technology (also called distributed ledger technology) is a decentralized distributed database technology having many characteristics such as decentralization, openness, transparency, immutability and trustability, and thus it is applicable to many application scenarios with high demands for data reliability.

SUMMARY

In view of this, one or more examples of the present disclosure provide blockchain integrated stations and automatic node adding methods and apparatuses thereof.

To achieve the above object, one or more examples of the present disclosure provide the following technical solution:

According to a first aspect of one or more examples of the present disclosure, provided is an automatic node adding method of a blockchain integrated station, including:

receiving, by the blockchain integrated station, a first configuration instruction after accessing a certificate authority network, initiating an authentication application to a certificate authority center according to a first network address indicated in the first configuration instruction, and receiving a digital certificate returned by the certificate authority center after the certificate authority center determines the authentication application passes verification;

receiving, by the blockchain integrated station, a second configuration instruction after accessing a blockchain network, and sending the digital certificate to a first blockchain node in the blockchain network according to a second network address indicated in the second configuration instruction, wherein the digital certificate is used to trigger the first blockchain node to add the blockchain integrated station as a newly-added blockchain node in the blockchain network.

According to a second aspect of one or more examples of the present disclosure, provided is an automatic node adding apparatus of a blockchain integrated station, including:

a certificate applying unit, configured to enable the blockchain integrated station to receive a first configuration instruction after accessing a certificate authority network, initiate an authentication application to a certificate authority center according to a first network address indicated in the first configuration instruction, and receive a digital certificate returned by the certificate authority center after the certificate authority center determines the authentication application passes verification;

a certificate sending unit, configured to enable the blockchain integrated station to receive a second configuration instruction after accessing a blockchain network, and send the digital certificate to a first blockchain node in the blockchain network according to a second network address indicated in the second configuration instruction, wherein the digital certificate is used to trigger the first blockchain node to add the blockchain integrated station as a newly-added blockchain node in the blockchain network.

According to a third aspect of one or more examples of the present disclosure, provided is a blockchain integrated station, including:

a processor;

a memory for storing processor executable instructions;

wherein the processor implements the method according to the first aspect by running the executable instructions.

According to a fourth aspect of one or more examples of the present disclosure, provided is a computer readable storage medium having computer instructions stored thereon, wherein the instructions are executed by a processor to implement steps in the method according to the first aspect.

DETAILED DESCRIPTION OF THE EMBODIMENTS

Example embodiments will be described in detail herein with the example embodiments thereof expressed in the drawings. When the following descriptions involve the drawings, same numbers in different drawings represent same or similar elements unless stated otherwise. The implementations described in the following example embodiments do not represent all implementations consistent with one or more embodiments of the present disclosure. On the contrary, they are merely embodiments of apparatuses and methods consistent with some aspects of one or more embodiments of the present disclosure described in detail in the appended claims.

It should be noted that the steps of corresponding method are not necessarily performed according to the sequence shown in the present disclosure in other embodiments. In some other embodiments, the steps included in the corresponding method can be more or less than described in the specification. Further, a single step described in the specification may be divided into several steps for descriptions in other embodiments while several steps described in the specification may be combined into a single step for descriptions in other embodiments.

In the early stage of development of the blockchain technology, users mostly add their own personal computer (PC) and laptop computer and the like into a blockchain network to become a blockchain node in the blockchain network. At this time, the stage can be called 1.0 architecture era of blockchain network, in which the behaviors of users to participate in the blockchain network are autonomous and the users also need to perform autonomous maintenance, for example, perform maintenance and configuration and so on for their devices (for example, PC) participating in the blockchain network. Along with continuous development of the blockchain technology, especially along with increasing needs of users for infrastructures with high performance and high availability, the blockchain network develops into 2.0 architecture era based on cloud service. In the 2.0 architecture era, Blockchain-as-a-Service (BaaS) provides fast and convenient solutions for fast blockchain deployment and technical implementation and supports a large number of blockchain service projects. Generally, BaaS is built on infrastructures such as public cloud or private cloud, which introduces heavy dependence on infrastructure as well as providing strong deployment capability. However, because blockchain is a typical distributed computing technology, not all nodes can be migrated to clouds but privatization deployment is needed. The additional technical migration and maintenance costs brought by the privatization deployment cause inconsistent technical interfaces and high deployment and maintenance costs during an actual implementation. Therefore, to satisfy the needs of users for privatization and security and the like of the blockchain network, further architecture upgrade needs to be performed to the blockchain network, thereby realizing 3.0 architecture era based on blockchain integrated station.

Software and hardware integration can be realized for the blockchain integrated station. When providing a blockchain integrated station, a provider will not only provide hardware devices of the blockchain integrated station to users but also provide software configurations for realizing deep optimizations of the hardware devices integrated into the blockchain integrated station, thereby realizing the above software-hardware integration.

Hardware optimization can be realized for the blockchain integrated station. For example, a dedicated smart contract processing chip can be deployed on the blockchain integrated station. For example, the smart contract processing chip can be Field Programmable Gate Array (FPGA) chip, or another type of chip to increase the processing efficiency for a smart contract. A hardware root-of-trust key can be deployed on the smart contract processing chip, for example, the hardware root-of-trust key can be pre-programmed by the provider into the smart contract processing chip and the provider can also know a public key corresponding to the hardware root-of-trust key (for example, the key is disclosed). Therefore, the smart contract processing chip can send negotiation information to the provider and sign the negotiation information by using the hardware root-of-trust key, so that the provider can verify the signature based on the corresponding public key; and, after successful signature verification, it is ensured that the smart contract processing chip and the provider obtain the same key through negotiation based on the above negotiation information. The negotiated key can include a file deployment key, and thus the provider can encrypt and transmit a binary image file needed by the blockchain node to the smart contract processing chip based on the file deployment key, and the smart contract processing chip can decrypt and deploy the binary image file based on the file deployment key. The negotiated key can include a service secret deployment key, and thus the provider can encrypt and transmit a node private key of the blockchain node, a service root key of the blockchain node, etc., to the smart contract processing chip based on the service secret deployment key, and the smart contract processing chip can obtain and deploy the node private key and the service root key and the like based on the service secret deployment key to satisfy the privacy transaction needs in a blockchain scenario. For example, the node private key corresponds to a node public key, and thus a client device can perform encrypted transmission for a blockchain transaction by using the node public key, and the blockchain node can perform decryption by using the node private key. The service root key is a symmetric key which can be used to perform encrypted storage for service data such as contract codes and value of contract status and the like. The service root key may not be directly used, and the smart contract processing chip can perform encryption and decryption through a derivation key of the service root key to reduce the security risk of the service root key. Through reliable management for the node private key and the service root key (or its derivation key), data will be always in encrypted state unless processed by the smart contract processing chip. Therefore, the smart contract processing chip actually forms a Trusted Execution Environment (TEE) of hardware on the blockchain integrated station, so as to ensure the data requiring privacy protection such as transactions, contract codes, and contract statuses will not be leaked.

For another example, an intelligent network card can be deployed on the blockchain integrated station. In addition to realizing a traditional network card function, the intelligent network card also can replace or assist a CPU of the blockchain integrated station to perform partial functions so as to offload computation of the CPU. Especially, the operations with intensive network I/O can be transferred from CPU to the intelligent network card to perform, so that the CPU can process more computation-intensive operations, for example, transaction processing, and storage processing and the like. Compared with other components (for example, CPU) on the blockchain integrated station, the intelligent network card is closer to the network regardless of physical level or logical level, so the intelligent network card can always fetch data transmitted in the network preferentially. Therefore, with no storage access or a small amount of storage access is involved, the intelligent network card can process these data with a relatively higher processing efficiency and a relatively smaller delay, and a relatively larger throughput, so as to achieve a higher performance benefit with a lower cost. For example, in consensus algorithm, there is almost no need to access storage except in the cases of change of network status, addition and deletion of node, change of consensus configuration and the like. Therefore, the consensus operation can be completed by the intelligent network card and only need to inform the CPU of a consensus result. Therefore, the CPU is not required to directly participate in the consensus process, thereby significantly improving the consensus efficiency. Similarly, the same effect can be achieved in forwarding transactions by the intelligent network card and achieving block synchronization by the intelligent network card on a newly-added blockchain node and the like and will not be repeated herein. Furthermore, after receiving transactions, the intelligent network card can identify or filter out a replay transaction by comparing the received transaction with historical transactions, for example, comparing data fields of sender information of transaction, destination address, time stamp, and hash value and the like. The intelligent network card can also perform content analysis for those received transactions, so as to filter out illegal transactions or predefined undesired transactions and the like as a supplementation to layer-2 or layer-3 packet filtering implemented by a switch.

For another example, a cryptographic acceleration card which is also called a high-speed cryptographic card can be deployed on the blockchain integrated station. The cryptographic acceleration card can realize total encrypted memory, defend against side-channel attacks by hardware reinforcement, and also realize physical protection against approaches such as probe, laser and the like, having very high security. For example, the cryptographic acceleration card used on the blockchain integrated station can have level-2 qualification from the State Cryptography Administration, level-3 qualification from the State Cryptography Administration and the like. When the cryptographic acceleration card is deployed, the hardware roof-of-trust key as described above can be maintained in the cryptographic acceleration card, and the cryptographic acceleration card can perform signature operation based on the hardware roof-of-trust key and replace or assist the smart contract processing chip to complete the operations such as the key negotiation as described above. Similarly, the cryptographic acceleration card can be used to maintain a public key so that the cryptographic acceleration card can realize signature verification operation based on the maintained public key. In short, at least part of operations relating to key management, encryption and decryption, and signature verification and the like on the blockchain integrated station can be handed over to the cryptographic acceleration card, so that very high security can be realized and task offloading can be realized for the CPU of the blockchain integrated station or the above smart contract processing chip, thereby improving the processing efficiency.

Software optimization can be realized for the blockchain integrated station. For example, a certificate authority service can be built in the blockchain integrated station to realize automatic certificate issuing, node identity authentication, automatic blockchain construction, and automatic adding of blockchain node, thereby realizing the plug and play of the blockchain integrated station. In this case, a user can realize fast deployment of the blockchain integrated station. In addition to quickly establishing a private blockchain network among a plurality of blockchain integrated stations, the blockchain integrated station can integrate a standardized on-cloud service interface to enable the blockchain integrated station to automatically connect to on-cloud service, thereby realizing hybrid deployment between the blockchain integrated station and the cloud-deployed blockchain node to construct a hybrid blockchain network. The blockchain integrated station can also integrate a standardized cross-chain service interface to enable the blockchain integrated station to realize cross-chain services based on a standardized cross-chain protocol or standardized cross-chain service, thereby greatly expanding the application scenarios of the blockchain integrated station, and satisfying the cross-chain needs of users. For example, cross-chain data interaction between different blockchain networks is achieved, and for another example, cross-chain data interaction between the blockchain network and an off-chain computing node and the like is achieved (for example, the off-chain computing node shares computation task for the blockchain node and the like).

Based on the unified software logic adopted on each blockchain integrated station, the blockchain integrated station in the present disclosure can realize automatic node adding after accessing a blockchain network, which will be described below in combination with the accompanying drawings.

Figure 1:
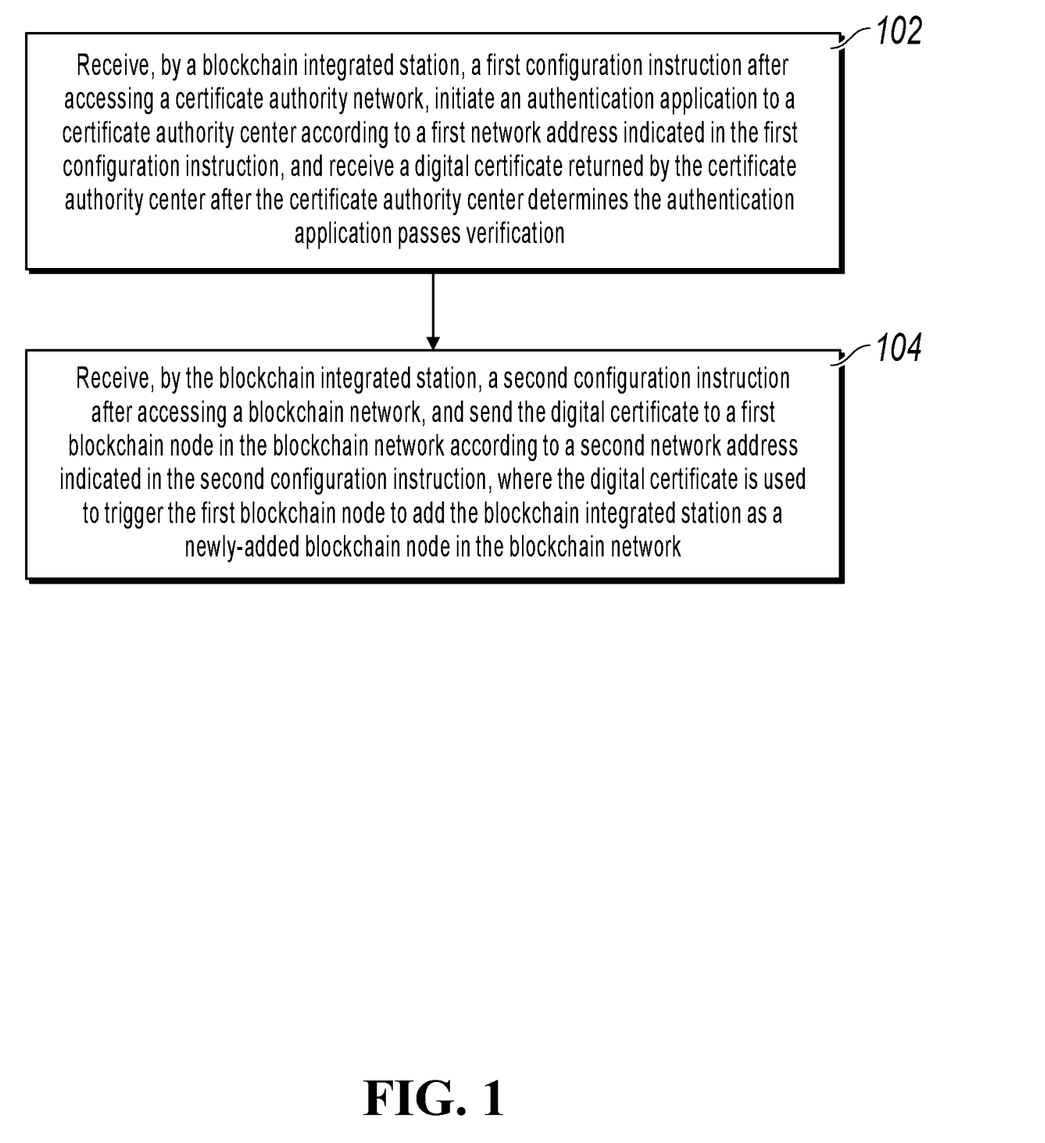
FIG. 1 is a flowchart of an automatic node adding method of a blockchain integrated station according to example embodiments of the present disclosure.

FIG. 1 is a flowchart of an automatic node adding method of a blockchain integrated station according to example embodiments of the present disclosure. As shown in FIG. 1, the method can include the following steps.

At step 102, the blockchain integrated station receives a first configuration instruction after accessing a certificate authority network, initiates an authentication application to a certificate authority center according to a first network address indicated in the first configuration instruction, and receives a digital certificate returned by the certificate authority center after the certificate authority center determines the authentication application passes verification.

The certificate authority network is different from a blockchain network, that is, the two networks are different networks. The certificate authority network and the blockchain network can be different public networks or can be different dedicated networks, or one of the certificate authority network and the blockchain network is a public network and the other is a dedicated network, which is not limited herein. In a typical application scenario, the blockchain network is a public network. In order to avoid participating in the blockchain network at discretion, the blockchain integrated station needs to firstly access a certificate authority network to obtain a digital certificate, that is, to obtain authorization of the certificate authority center, and then participates as a node in the blockchain network based on the digital certificate. Those blockchain integrated stations without obtaining digital certificate cannot participate in the blockchain network.

The first configuration instruction received by the blockchain integrated station is used to configure the above first network address. The first configuration instruction can be input into the blockchain integrated station by a user using an external device, that is, the value of the first network address is actually configured by the user. Alternatively, the first network address can be pre-configured in the blockchain integrated station in factory settings and thus the first configuration instruction can be automatically generated by the blockchain integrated station after initial startup. The first network address corresponds to the certificate authority (CA) center. For example, the first network address can be an IP address of the CA center. The certificate authority center can be any entity deployed in the certificate authority network. For example, the certificate authority center can be deployed on an independent device in the certificate authority network, or on a BaaS platform in the certificate authority network.

When issuing a digital certificate, the certificate authority center needs to use its own CA identity key which includes a CA private key and a CA public key. Similarly, the blockchain integrated station also has a kiosk identity key which includes a kiosk private key and a kiosk public key. The kiosk private key is maintained by the blockchain integrated station, and the kiosk public key is included in the above authentication application. Further, the authentication application includes other description information of the blockchain integrated station. This description information is used for the certificate authority center to determine the identity of the blockchain integrated station. After determining the authentication application passes verification, the certificate authority center signs the kiosk public key, the kiosk description information, and information of the certificate authority center by using the above CA private key, so as to generate the digital certificate of the blockchain integrated station.

At step 104, the blockchain integrated station receives a second configuration instruction after accessing the blockchain network, and sends the digital certificate to a first blockchain node in the blockchain network according to a second network address indicated in the second configuration instruction, where the digital certificate is used to trigger the first blockchain node to add the blockchain integrated station as a newly-added blockchain node in the blockchain network.

The second configuration instruction received by the blockchain integrated station is used to configure the above second network address. The second configuration instruction can be input into the blockchain integrated station by a user using an external device, that is, the value of the second network address is actually configured by the user. Alternatively, the second network address can be pre-configured in the blockchain integrated station upon leaving factory and thus the second configuration instruction can be automatically generated by the blockchain integrated station after initial startup. The second network address corresponds to any blockchain node in the blockchain network, that is, any blockchain node in the blockchain network can be taken as the above first blockchain node. For example, the second network address can be an IP address of the first blockchain node. The first blockchain node can be deployed on a particular blockchain integrated station, or on another device.

After accessing the blockchain network, the blockchain integrated station only realizes hardware-level network access. In a logical level, the blockchain integrated station has not become a blockchain node in the blockchain network. The blockchain integrated station needs to adopt the technical solution of the present disclosure to become a blockchain node in the blockchain network.

Because the certificate authority center and the first blockchain node are in different networks respectively, the certificate authority center and the first blockchain node are usually different entities. However, in some cases, the certificate authority center and the first blockchain node may be deployed on a same physical device. For example, the physical device can be a blockchain integrated station, that is, the certificate authority center and the first blockchain node are deployed on the blockchain integrated station at the same time, and the certificate authority center and the first blockchain node belong to different networks respectively.

The digital certificate issued by the certificate authority center is used to indicate that the blockchain integrated station corresponding to the digital certificate already passes the identity authentication of the certificate authority center. Therefore, by performing verification for the digital certificate provided by the blockchain integrated station, the first blockchain node can add the blockchain integrated station as a newly-added blockchain node in the blockchain network after successful verification.

When performing verification for the digital certificate of the blockchain integrated station, the first blockchain node needs to use a root certificate. The root certificate is a digital certificate issued by the certificate authority center for itself. The certificate authority center generates the above root certificate by signing the CA public key and description information of the certificate authority center through the above CA private key. Because the certificate authority center generates the digital certificate by signing its own public key with its own private key, the digital certificate corresponding to the certificate authority center is a root certificate which is also called a self-signed certificate. The first blockchain node can obtain the CA public key included in the root certificate and perform signature verification for the digital certificate sent by the blockchain integrated station by using the CA public key after receiving the digital certificate. In this way, in a case of successful verification, the first blockchain node determines the digital certificate is issued by the certificate authority center and accepts the corresponding blockchain integrated station as a blockchain node in the blockchain network.

After being determined as passing verification by any blockchain node in the blockchain network, the digital certificate is used to indicate the any blockchain node to initiate a transaction for adding node in the blockchain network. The transaction is executed after passing a consensus among all blockchain nodes in the blockchain network, so that the blockchain integrated station corresponding to the digital certificate is added as a newly-added blockchain node in the blockchain network.

With the first blockchain node as an example, the first blockchain node verifies the digital certificate sent by the blockchain integrated station by using the CA public key included in the root certificate, and creates a transaction for adding node after successful verification. For example, the type of the transaction is a node adding type (for example, the type can be determined according to the value of Type field of transaction), and the Data field of the transaction includes information of the above blockchain integrated station. The transaction is sent by the first blockchain node to all blockchain nodes in the blockchain network and a consensus is performed among all blockchain nodes: if the above transaction passes the consensus, it indicates that all blockchain nodes in the blockchain network accept the above blockchain integrated station. In this case, the above transaction is recorded into a blockchain, and the blockchain integrated station is added as a newly-added blockchain node in the blockchain network. Where, each blockchain node in the blockchain network can respectively maintain one node information list, which is used to record information of a blockchain node accepted by the each blockchain node, for example, the information can include IP address and public key and the like. Thus, after the above blockchain integrated station is accepted, the information of the blockchain integrated station is recorded by each blockchain node in the blockchain network into the node information list maintained by each blockchain node. Similarly, after the blockchain integrated station becomes a newly-added blockchain node, the blockchain integrated station can synchronize the node information list in addition to synchronizing blockchain data and status data and the like with the existing blockchain nodes.

After the blockchain integrated station accesses the blockchain network, a blockchain node in the blockchain network can automatically discover the blockchain integrated station. For example, when a second blockchain node discovers the blockchain integrated station, the second blockchain node can proactively send inquiry information to the blockchain integrated station. Correspondingly, the blockchain integrated station can send the above digital certificate to the second blockchain node in response to receiving the inquiry information, where the digital certificate is used to trigger the second blockchain node to add the blockchain integrated station as a newly-added blockchain node in the blockchain network. The process in which the second blockchain node adds the blockchain integrated station as a newly-added blockchain node is similar to that of the first blockchain node, that is, a transaction for adding node is initiated after it is determined the digital certificate passes verification, so that the blockchain integrated station is added as a newly-added blockchain node after the transaction passes consensus, which will not be repeated herein. Although the blockchain integrated station can proactively send the digital certificate to the first blockchain node for identity verification according to a configured second network address, the first blockchain node may not work normally due to some reason and thus cannot smoothly add the blockchain integrated station as a newly-added blockchain node. In this case, with the automatic discovery function of the second blockchain node for the blockchain integrated station, it is guaranteed that the blockchain integrated station can be smoothly added to the blockchain network without configuring a new second network address in a case of abnormality of the first blockchain node, thus avoiding failure of adding the blockchain integrated station. In this way, a time required for adding the blockchain integrated station can be shortened.

Figure 2:
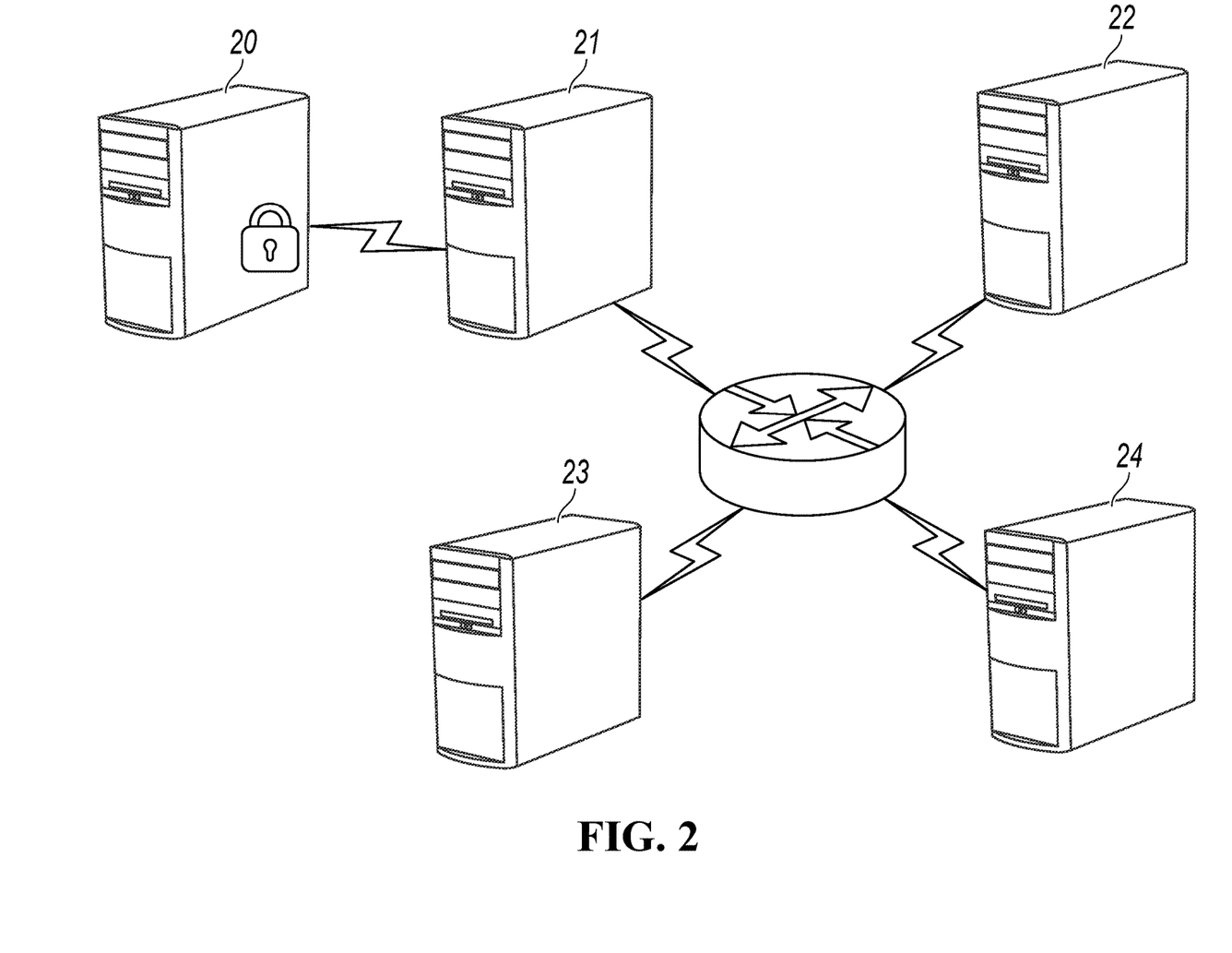
FIG. 2 is a schematic diagram of a scenario in which a blockchain integrated station realizes automatic node addition to a blockchain network according to example embodiments of the present disclosure.

FIG. 2 shows an example scenario where a blockchain integrated station realizes automatic node adding in a blockchain network. FIG. 2 involves a CA center 20, a blockchain integrated station 21, a blockchain integrated station 22, a blockchain integrated station 23, and a blockchain integrated station 24. Of course, the quantity of the blockchain integrated stations is not limited herein. Assuming that the blockchain integrated stations 22-24 already become blockchain nodes in the blockchain network and that the blockchain integrated station 21 desires to participate in the blockchain network as a newly-added node, the blockchain integrated station 21 can become a new node of the blockchain network through the interaction process of FIG. 3.

Figure 3:
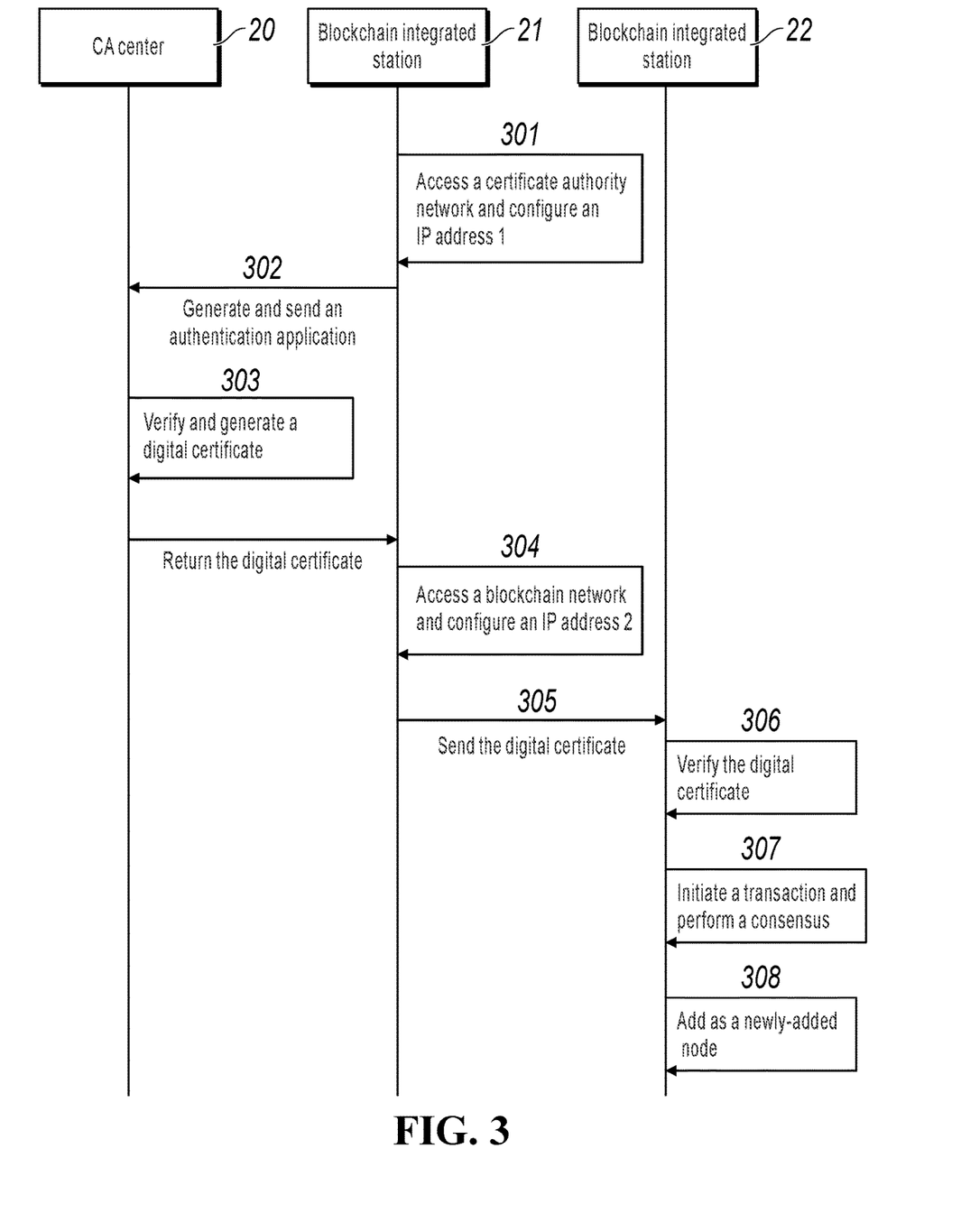
FIG. 3 is an interaction flowchart in which a blockchain integrated station realizes automatic node addition according to example embodiments of the present disclosure.

At step 301, the blockchain integrated station 21 accesses a certificate authority network and configures an IP address 1.

The certificate authority network is a network where the CA center 20 is located. The blockchain integrated station 21 interacts with the CA center 20 by accessing the certificate authority network and requests the CA center 20 to issue a digital certificate. After accessing the certificate authority network, the blockchain integrated station 21 configures the IP address 1 of the CA center 20 according to a received IP address configuration instruction.

At step 302, the blockchain integrated station 21 generates and sends an authentication application to the CA center 20.

The blockchain integrated station 21 generates a kiosk identity key which can include a kiosk private key and a kiosk public key. The authentication application generated by the blockchain integrated station 21 can include the kiosk public key and description information of the blockchain integrated station 21. The description information of blockchain integrated station can include ID information, product serial number, IP address, MAC address and the like. Thus, the description information is not limited herein as long as it can prove the identity of the blockchain integrated station.

At step 303, the CA center 20 performs identity verification and generates and returns a digital certificate to the blockchain integrated station 21.

After receiving the authentication application from the blockchain integrated station 21, the CA center 20 verifies the description information of the blockchain integrated station 21 included in the authentication application and then generates the digital certificate for the blockchain integrated station 21 after successful verification. Specifically, a CA identity key exists in the CA center 20, and the CA identity key includes a CA private key and a CA public key. The CA center 20 can sign the kiosk public key and the description information of the blockchain integrated station 21, and the description information of the CA center 20 through the CA private key to generate a digital certificate corresponding to the blockchain integrated station 21. Herein, the description information of the blockchain integrated station 21 adopted for signature can be inconsistent with the description information of the CA center 20, for example, they can include different types of description information, which depends on a rule set by a CA service. Similarly, the description information of the blockchain integrated station 21 included in the authentication application can be inconsistent with the description information of the blockchain integrated station 21 adopted for signature, for example, the description information adopted for signature can be only part of the description information included in the authentication application, and especially can exclude part of description information that is not suitable for disclosure (for example, relating to privacy), for another example, the description information adopted for signature can be a hash value of the description formation included in the authentication application. Thus, the digital certificate can fully correspond to the description information included in the authentication application, and be prevented from disclosing the description information unsuitable for disclosure.

At step 304, the blockchain integrated station 21 accesses a blockchain network and configures an IP address 2.

After accessing the blockchain network, the blockchain integrated station 21 configures the IP address 2 of the blockchain integrated station 22 according to a received IP address configuration instruction. Of course, the blockchain integrated station 21 can also configure the IP address of any blockchain node in the blockchain network, such as the blockchain integrated station 23, and the blockchain integrated station 24 as well as the blockchain integrated station 22, which is not limited herein.

At step 305, the blockchain integrated station 21 sends the digital certificate to the blockchain integrated station 22 for verification.

At step 306, the blockchain integrated station 22 verifies the digital certificate.

When verifying the digital certificate, the blockchain integrated station 22 needs to use the root certificate generated by the CA center 20. The CA center 20 can sign the CA public key and the description information of the CA center 20 though the above CA private key to generate a digital certificate corresponding to the CA center 20, i.e. the above root certificate. When performing verification for the digital certificate, the blockchain integrated station 22 needs to obtain the CA public key from the root certificate and perform signature verification for the digital certificate sent by the blockchain integrated station 21 by using the CA public key. If the signature verification is successful, it indicates that the digital certificate is indeed issued by the CA center 20. Thus, the blockchain integrated station 22 can preliminarily determine the blockchain integrated station 21 as a blockchain node based on the endorsement of the CA center 20 for the blockchain integrated station 21.

At step 307, after the verification is successful, the blockchain integrated station 22 initiates a transaction for adding node in the blockchain network and performs transaction consensus with other blockchain nodes.

At step 308, after the transaction passes the consensus, the blockchain integrated station 22 adds the blockchain integrated station 21 as a newly-added node.

After the blockchain integrated station 22 preliminarily determines the blockchain integrated station 21 as a blockchain node, other blockchain nodes in the blockchain network also need to accept the blockchain integrated station 21. Only in this way can the blockchain integrated station 21 be really added as a newly-added node. Therefore, the blockchain integrated station 22 can submit a transaction for adding node. The value of the Type field of the transaction can indicate it is a transaction of a node adding type, and the Data field of the transaction can include information of the blockchain integrated station 21, for example, the IP address, the kiosk public key and the digital certificate and the like of the blockchain integrated station 21. After the above transaction is submitted, all blockchain nodes in the blockchain network will receive the transaction and further perform consensus for the transaction. If a particular blockchain node accepts the blockchain integrated station 21 and agrees to add the blockchain integrated station 21 as a newly-added node, the blockchain node can agree to record the above transaction on the blockchain. When all blockchain nodes agree to record the transaction on the blockchain, it indicates that the above transaction passes consensus. At this time, the blockchain integrated station 21 is added as a newly-added node in the blockchain network.

Each blockchain node in the blockchain network can maintain one node information list to record node information of all blockchain nodes accepted by it, such as IP address, public key, and digital certificate of node. In the above example, the blockchain integrated stations 22-24 maintain a node information list respectively, and add the information of the blockchain integrated station 21 to respective node information lists after the above transaction passes consensus, which indicates the blockchain integrated station 21 is determined as a newly-added node. Only after the blockchain integrated station 21 becomes the newly-added node can the blockchain integrated stations 22-24 allow data synchronization with the blockchain integrated station 21, where the data synchronization includes blockchain data synchronization, and status data synchronization. Alternatively, the status data does not have to be synchronized because the blockchain integrated station 21 can calculate the status data after obtaining the blockchain data. Further, the blockchain integrated station 21 can also synchronize the node information lists maintained by the blockchain integrated stations 22-24 so that the node information list maintained by the blockchain integrated station 21 is obtained.

Thus, the blockchain integrated stations 21-24 can automatically complete digital certificate issuing and node authentication (based on verification of digital certificate) through the steps of FIG. 3 so that each blockchain integrated station determines and records the identified blockchain nodes respectively so as to automatically add the blockchain integrated station 21 as a newly-added node in the blockchain network.

Figure 4:
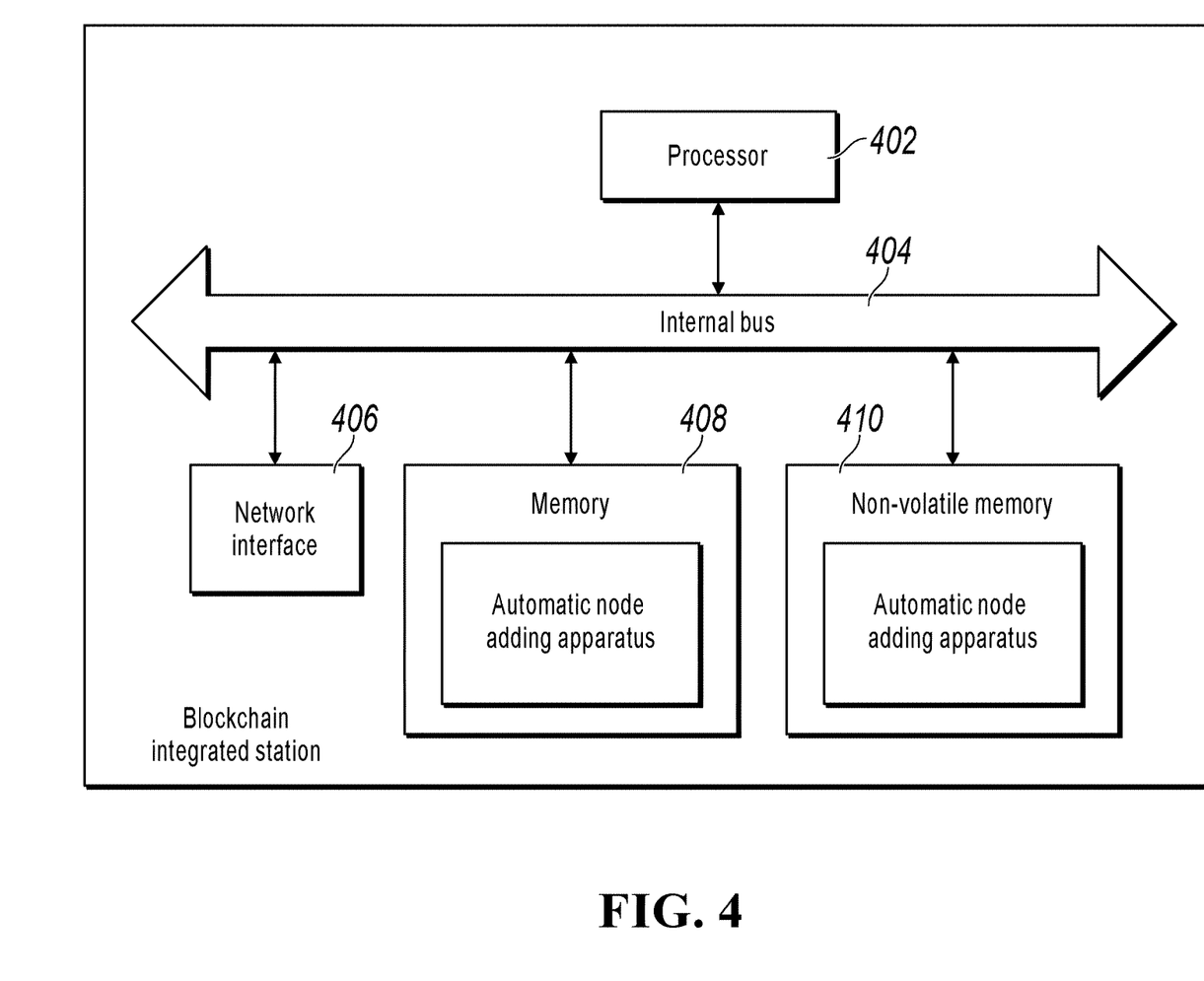
FIG. 4 is a structural schematic diagram of a blockchain integrated station according to example embodiments of the present disclosure.

FIG. 4 is a structural schematic diagram of a device according to example embodiments of the present disclosure. As shown in FIG. 4, from hardware level, the device includes a processor 402, an internal bus 404, a network interface 406, a memory 408 and a non-volatile memory 410. Of course, the device can further include hardware needed for other services. The processor 402 reads corresponding computer programs from the non-volatile memory 410 to the memory 408 for running, so as to logically form an automatic node adding apparatus of a blockchain integrated station. Of course, in addition to the software implementation, one or more examples of the present disclosure do not preclude other implementations, for example, logic device or a combination of software and hardware or the like. That is, the executing subject of the following processing flow is not limited to each logic unit and can also be hardware or logic device.

Figure 5:
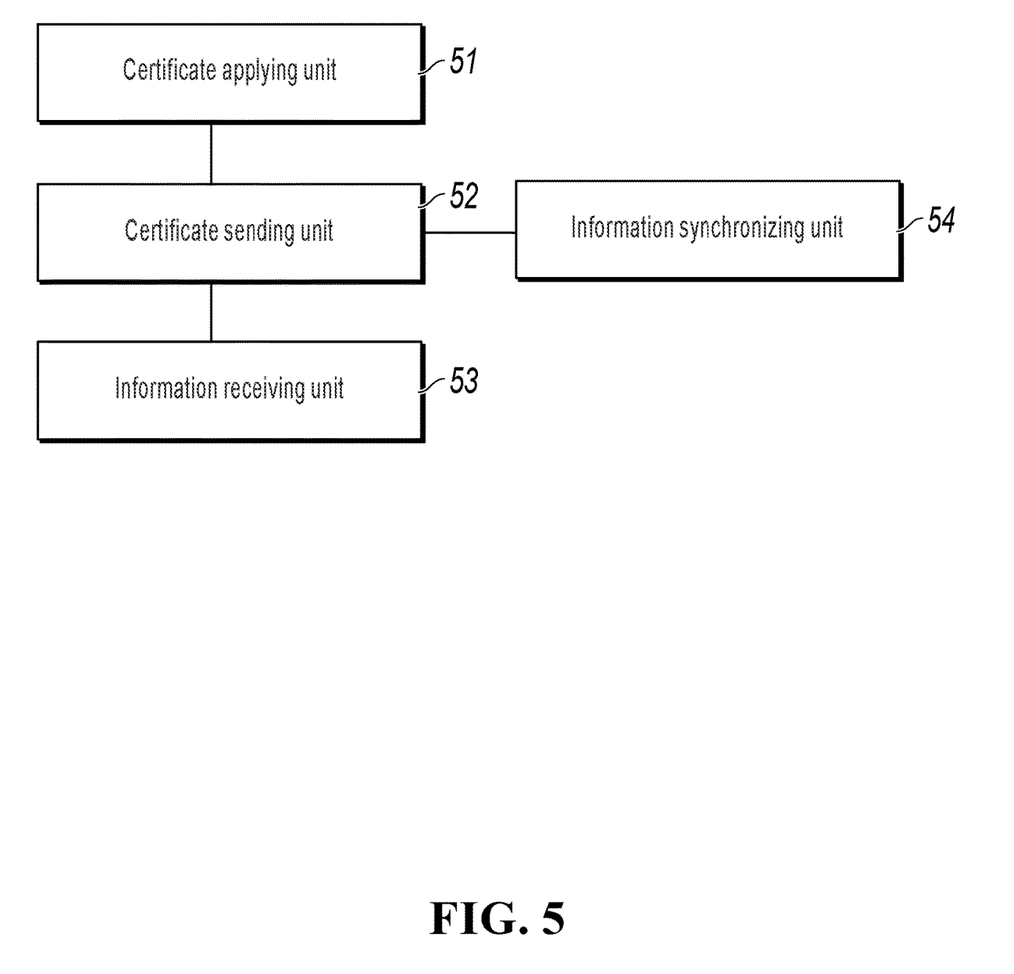
FIG. 5 is a block diagram of an automatic node adding apparatus of a blockchain integrated station according to example embodiments of the present disclosure.

As shown in FIG. 5, in a software implementation, the automatic node adding apparatus can include:

a certificate applying unit 51, configured to enable a blockchain integrated station to receive a first configuration instruction after accessing a certificate authority network, initiate an authentication application to a certificate authority center according to a first network address indicated in the first configuration instruction, and receive a digital certificate returned by the certificate authority center after the certificate authority center determines the authentication application passes verification;

a certificate sending unit 52, configured to enable the blockchain integrated station to receive a second configuration instruction after accessing a blockchain network, and send the digital certificate to a first blockchain node in the blockchain network according to a second network address indicated in the second configuration instruction, wherein the digital certificate is used to trigger the first blockchain node to add the blockchain integrated station as a newly-added blockchain node in the blockchain network.

Optionally, the certificate authority network and the blockchain network are different networks.

Optionally, the certificate authority center is deployed on a Blockchain-as-a-Service (BaaS) platform in the certificate authority network.

Optionally, the apparatus further includes:

an information receiving unit 53, configured to enable the blockchain integrated station to receive inquiry information of a second blockchain node in the blockchain network, where the inquiry information is generated and sent by the second blockchain node after the second blockchain node automatically discovers the blockchain integrated station.

The certificate sending unit 52 is further configured to enable the blockchain integrated station to send the digital certificate to the second blockchain node, where the digital certificate is used to trigger the second blockchain node to add the blockchain integrated station as a newly-added blockchain node in the blockchain network.

Optionally, after the digital certificate is determined as passing verification by any blockchain node in the blockchain network, the digital certificate is used to indicate the any blockchain node to initiate a transaction for adding node in the blockchain network. The transaction is executed after passing a consensus among all blockchain nodes in the blockchain network, so that the blockchain integrated station is added as a newly-added blockchain node in the blockchain network.

Optionally, the blockchain integrated station is added as a newly-added blockchain node in the blockchain network, including: adding, by all blockchain nodes in the blockchain network, the information of the blockchain integrated station to the node information lists maintained by all blockchain nodes respectively.

Optionally, the apparatus further includes:

an information synchronizing unit 54, configured to enable the blockchain integrated station to perform information synchronization for the node information list maintained by the blockchain integrated station according to the node information list maintained by any blockchain node in the blockchain network.

The systems, apparatuses, modules or units described in the above examples can be specifically implemented by a computer chip or an entity or can be implemented by a product with a particular function. A typical implementing device can be a computer and the computer can specifically be a personal computer, a laptop computer, a cellular phone, a camera phone, a smart phone, a personal digital assistant, a media player, a navigation device, an email transceiver, a game console, a tablet computer, a wearable device, or a combination of any several devices of the above devices.

In a typical configuration, the computer can include one or more central processing units (CPU), an input/output interface, a network interface and a memory.

The memory can include a non-permanent memory, a random access memory (RAM), and/or a non-volatile memory and the like in a computer readable medium, for example, read only memory (ROM), or flash RAM. The memory is one example of the computer readable medium.

The computer readable medium includes permanent, non-permanent, mobile and non-mobile media, which can realize information storage by any method or technology. The information can be computer readable instructions, data structures, program modules and other data. The examples of the computer storage medium include but not limited to: a phase change random access memory (PRAM), a Static Random Access Memory (SRAM), a Dynamic Random Access Memory (DRAM), and other types of RAMs, Read-Only Memory (ROM), an Electrically-Erasable Programmable Read-Only Memory (EEPROM), a Flash Memory, or other memory technology, CD-ROM, digital versatile disc (DVD) or other optical storage, cassette type magnetic tape, magnetic disk storage, quantum memory, storage medium based on graphene, or other magnetic storage device or other non-transmission medium for storing information accessible by computing devices. According to the definition of the specification, the computer readable medium does not include transitory computer readable media, for example, modulated data signal and carriers.

It should be noted that the term "including", "containing" or any variation thereof is intended to encompass non-exclusive inclusion, so that a process, method, product or device including a series of elements includes not only those elements but also other elements not listed explicitly or those elements inherent to such a process, method, product or device. Without more limitations, an element defined by the statement "including a . . . " shall not be precluded to include additional same elements present in a process, method, product or device including the elements.

The specific examples are described as above. Other examples are within the scope of the appended claims. In some cases, the actions or steps recorded in the claims can be performed in a sequence different from the examples to achieve the desired result. Further, the processes shown in drawings do not necessarily require a particular sequence or a continuous sequence shown to achieve the desired result. In some examples, a multi-task processing and parallel processing is possible and may also be advantageous.

The terms used in one or more examples of the present disclosure are for the purpose of describing particular examples only, and are not intended to limit the one or more examples of the present disclosure. Terms "a", "the" and "said" used in their singular forms in one or more examples of the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although the terms "first," "second," "third," and the like can be used in one or more examples of the present disclosure to describe various information, such information should not be limited to these terms. These terms are only used to distinguish one category of information from another. For example, without departing from the scope of one or more examples of the present disclosure, first information may be referred as second information; and similarly, the second information may also be referred as the first information. Depending on the context, the term "if" as used herein can be interpreted as "when" or "upon" or "in response to determining".

The above-mentioned disclosure is merely illustrative of preferred examples of one or more examples of the present disclosure but not intended to limit the present disclosure, and any modifications, equivalent substitutions, adaptations thereof made within the spirit and principles of the disclosure shall be encompassed in the scope of protection of the present disclosure.

What is claimed is:

1. A blockchain integrated station comprising:
   at least one processor; and
   one or more memories coupled to the at least one processor and storing programming instructions for execution by the at least one processor to perform one or more operations comprising:
   receiving, by the blockchain integrated station, a first configuration instruction after accessing a certificate authority network;
   generating, by the blockchain integrated station, an authentication application;
   sending, by the blockchain integrated station, the authentication application to a certificate authority center of the certificate authority network based on a first network address indicated in the first configuration instruction;
   receiving, by the blockchain integrated station, a digital certificate from the certificate authority center after the certificate authority center determines that the authentication application passes verification;
   receiving, by the blockchain integrated station, a second configuration instruction after accessing a blockchain network; and
   sending, by the blockchain integrated station, the digital certificate to a first blockchain node in the blockchain network based on a second network address indicated in the second configuration instruction, wherein the digital certificate is used to trigger the first blockchain node to add the blockchain integrated station as a new blockchain node in the blockchain network, wherein after the digital certificate is verified by the first blockchain node, a transaction for adding the new blockchain node in the blockchain network is initiated, and wherein the transaction is executed after a plurality of blockchain nodes in the blockchain network reach a consensus on the transaction, wherein the blockchain integrated station is added as the new blockchain node by executing the transaction.

2. The blockchain integrated station of claim 1, wherein the certificate authority network and the blockchain network are different public networks.

3. The blockchain integrated station of claim 1, wherein the certificate authority center is deployed on a Blockchain-as-a-Service (BaaS) platform in the certificate authority network.

4. The blockchain integrated station of claim 1, the operations comprising:
    receiving, by the blockchain integrated station, inquiry information of a second blockchain node in the blockchain network, wherein the inquiry information is generated and sent by the second blockchain node after the second blockchain node discovers the blockchain integrated station; and
    sending, by the blockchain integrated station, the digital certificate to the second blockchain node, wherein the digital certificate is used to trigger the second blockchain node to add the blockchain integrated station as the new blockchain node in the blockchain network.

5. The blockchain integrated station of claim 1, wherein information of the blockchain integrated station is added by the first blockchain node to a node information list maintained by the first blockchain node.

6. The blockchain integrated station of claim 1, wherein the blockchain integrated station comprises a cryptographic acceleration card that is used to perform at least one of a key management operation, an encryption and decryption operation, or a signature verification operation, wherein the blockchain integrated station further comprises at least one of an intelligent network card or a smart contract processing chip, and wherein the blockchain integrated station comprises at least one of a certificate authority service, a standardized on-cloud service interface, or a standardized cross-chain service interface.

7. A computer-implemented method comprising:
    receiving, by a blockchain integrated station, a first configuration instruction after accessing a certificate authority network;
    generating, by the blockchain integrated station, an authentication application;
    sending, by the blockchain integrated station, the authentication application to a certificate authority center of the certificate authority network based on a first network address indicated in the first configuration instruction;
    receiving, by the blockchain integrated station, a digital certificate from the certificate authority center after the certificate authority center determines that the authentication application passes verification;
    receiving, by the blockchain integrated station, a second configuration instruction after accessing a blockchain network; and
    sending, by the blockchain integrated station, the digital certificate to a first blockchain node in the blockchain network based on a second network address indicated in the second configuration instruction, wherein the digital certificate is used to trigger the first blockchain node to add the blockchain integrated station as a new blockchain node in the blockchain network, wherein after the digital certificate is verified by the first blockchain node, a transaction for adding the new blockchain node in the blockchain network is initiated, and wherein the transaction is executed after a plurality of blockchain nodes in the blockchain network reach a consensus on the transaction, wherein the blockchain integrated station is added as the new blockchain node by executing the transaction.

8. The computer-implemented method of claim 7, wherein the certificate authority network and the blockchain network are different public networks.

9. The computer-implemented method of claim 7, wherein the certificate authority center is deployed on a Blockchain-as-a-Service (BaaS) platform in the certificate authority network.

10. The computer-implemented method of claim 7, comprising:
    receiving, by the blockchain integrated station, inquiry information of a second blockchain node in the blockchain network, wherein the inquiry information is generated and sent by the second blockchain node after the second blockchain node discovers the blockchain integrated station; and
    sending, by the blockchain integrated station, the digital certificate to the second blockchain node, wherein the digital certificate is used to trigger the second blockchain node to add the blockchain integrated station as the new blockchain node in the blockchain network.

11. The computer-implemented method of claim 7, wherein information of the blockchain integrated station is added by the first blockchain node to a node information list maintained by the first blockchain node.

12. The computer-implemented method of claim 7, wherein the blockchain integrated station comprises a cryptographic acceleration card that is used to perform at least one of a key management operation, an encryption and decryption operation, or a signature verification operation, wherein the blockchain integrated station further comprises at least one of an intelligent network card or a smart contract processing chip, and wherein the blockchain integrated station comprises at least one of a certificate authority service, a standardized on-cloud service interface, or a standardized cross-chain service interface.

13. A computer-implemented system comprising:
    one or more blockchain integrated stations; and
    one or more computer memory devices coupled with the one or more blockchain integrated stations and having tangible, non-transitory, machine-readable media storing one or more instructions that, when executed by the one or more blockchain integrated stations, perform one or more operations comprising:
        receiving, by a blockchain integrated station, a first configuration instruction after accessing a certificate authority network;
        generating, by the blockchain integrated station, an authentication application;
        sending, by the blockchain integrated station, the authentication application to a certificate authority center of the certificate authority network based on a first network address indicated in the first configuration instruction;
        receiving, by the blockchain integrated station, a digital certificate from the certificate authority center after the certificate authority center determines that the authentication application passes verification;
        receiving, by the blockchain integrated station, a second configuration instruction after accessing a blockchain network; and
        sending, by the blockchain integrated station, the digital certificate to a first blockchain node in the blockchain network based on a second network address indicated in the second configuration instruction, wherein the digital certificate is used to trigger the first blockchain node to add the blockchain integrated station as a new blockchain node in the blockchain network, wherein after the digital certificate is verified by the first blockchain node, a transaction for adding the new blockchain node in the blockchain network is initiated, and wherein the transaction is executed after a plurality of blockchain nodes in the blockchain network reach a consensus on the transaction, wherein the blockchain integrated station is added as the new blockchain node by executing the transaction.

14. The computer-implemented system of claim 13, wherein the certificate authority network and the blockchain network are different public networks.

15. The computer-implemented system of claim 13, wherein the certificate authority center is deployed on a Blockchain-as-a-Service (BaaS) platform in the certificate authority network.

16. The computer-implemented system of claim 13, the operations comprising:
   receiving, by the blockchain integrated station, inquiry information of a second blockchain node in the blockchain network, wherein the inquiry information is generated and sent by the second blockchain node after the second blockchain node discovers the blockchain integrated station; and
   sending, by the blockchain integrated station, the digital certificate to the second blockchain node, wherein the digital certificate is used to trigger the second blockchain node to add the blockchain integrated station as the new blockchain node in the blockchain network.

17. The computer-implemented system of claim 13, wherein information of the blockchain integrated station is added by the first blockchain node to a node information list maintained by the first blockchain node.

* * * * *